(12) United States Patent
Rosca et al.

(10) Patent No.: US 10,072,855 B2
(45) Date of Patent: Sep. 11, 2018

(54) COMBINATION ISOLATION VALVE AND CHECK VALVE WITH INTEGRAL FLOW RATE, PRESSURE, AND/OR TEMPERATURE MEASUREMENT WITH WIRELESS POWER

(71) Applicant: Fluid Handling LLC, Morton Grove, IL (US)

(72) Inventors: Florin Rosca, Niles, IL (US); Andrea Pezzuolo, Rovigo (IT)

(73) Assignee: Fluid Handling LLC, Morton Grove, IL (US)

( * ) Notice: Subject to any disclaimer, the term of this patent is extended or adjusted under 35 U.S.C. 154(b) by 0 days.

(21) Appl. No.: 15/262,430

(22) Filed: Sep. 12, 2016

(65) Prior Publication Data

US 2017/0191681 A1 Jul. 6, 2017

Related U.S. Application Data

(60) Provisional application No. 62/217,355, filed on Sep. 11, 2015.

(51) Int. Cl.
*F16K 15/18* (2006.01)
*F24F 5/00* (2006.01)
(Continued)

(52) U.S. Cl.
CPC ............ *F24F 5/0003* (2013.01); *F16K 15/18* (2013.01); *F16K 17/003* (2013.01);
(Continued)

(58) Field of Classification Search
CPC .... F16K 17/003; F16K 37/0091; F16K 49/00; F16K 21/00; F16K 15/18; F24F 5/0003
See application file for complete search history.

(56) References Cited

U.S. PATENT DOCUMENTS 5,119,988 A 6/1992 Fiedrich
5,224,648 A 7/1993 Simon et al.
(Continued)

FOREIGN PATENT DOCUMENTS

WO 2010093234 8/2010

OTHER PUBLICATIONS

Batista, G., et al, "Control, Regulation and Command System of Hydronic Radiant Floors Heating by Wireless and Energy Harvesting Sensors and Actuators," Key Engineering Materials (Mar. 2013) 543:389-392.

(Continued)

*Primary Examiner* — Kevin Lee
(74) *Attorney, Agent, or Firm* — Ware, Fressola, Maguire & Barber LLP

(57) ABSTRACT

A wirelessly powered system includes a wirelessly powered combination isolation valve and check valve for a hydronic system, having a positive shut-off isolation valve configured in the hydronic system to prevent fluid flow, including to allow for maintenance of the hydronic system, a check valve configured in the hydronic system to prevent backflow and gravity circulation which can harm the hydronic system, and a combination of one or more sensors configured to sense a corresponding combination of one or more pressure, temperature or flow measurements of the fluid flow in the hydronic system and provide sensor signaling containing information about the corresponding combination of the one or more pressure, temperature or flow measurements sensed of the fluid flow in the hydronic system; and an onboard wireless power receiver configured to receive wireless power signaling, and provide power to energize the combination of the one or more sensors.

13 Claims, 1 Drawing Sheet

(51) Int. Cl.
    *F16K 37/00*     (2006.01)
    *G01K 1/08*     (2006.01)
    *G01F 15/14*     (2006.01)
    *G01L 19/14*     (2006.01)
    *H02J 50/20*     (2016.01)
    *H02M 7/02*     (2006.01)
    *F16K 17/00*     (2006.01)
    *F24F 11/00*     (2018.01)
    *F24F 140/20*     (2018.01)
    *F24F 140/12*     (2018.01)
    *F24F 11/84*     (2018.01)

(52) U.S. Cl.
CPC .......... *F16K 37/0091* (2013.01); *G01F 15/14* (2013.01); *G01K 1/08* (2013.01); *G01L 19/14* (2013.01); *H02J 50/20* (2016.02); *H02M 7/02* (2013.01); *F24F 11/84* (2018.01); *F24F 2011/0043* (2013.01); *F24F 2011/0045* (2013.01); *F24F 2011/0082* (2013.01); *F24F 2140/12* (2018.01); *F24F 2140/20* (2018.01)

(56) References Cited

U.S. PATENT DOCUMENTS

| | | |
|---|---|---|
| 6,983,764 B2 | 1/2006 | Arrowood et al. |
| 7,400,253 B2 | 7/2008 | Cohen |
| 7,445,025 B2 | 11/2008 | Shafique et al. |
| 7,886,766 B2 | 2/2011 | Radomsky et al. |
| 8,041,461 B2 | 10/2011 | Milder et al. |
| 8,109,289 B2 | 2/2012 | Trnka et al. |
| 8,552,597 B2 | 10/2013 | Song et al. |
| 8,552,838 B2 | 10/2013 | Addy |
| 8,567,757 B2 | 10/2013 | Pitchford et al. |
| 8,714,236 B2 * | 5/2014 | Karamanos ........... F24F 1/0059 165/11.1 |
| 8,978,750 B2 | 3/2015 | Noske et al. |
| 9,366,582 B2 * | 6/2016 | Rosca et al. ............... G01F 1/00 |
| 9,785,155 B2 * | 10/2017 | Rhee et al. ............ G01D 4/004 |
| 2007/0168150 A1 | 7/2007 | Hirata et al. |
| 2010/0181067 A1 | 7/2010 | Chen et al. |
| 2011/0172830 A1 | 7/2011 | Milder et al. |
| 2013/0239673 A1 | 9/2013 | Garcia-Osuna et al. |
| 2013/0265140 A1 | 10/2013 | Gudan et al. |
| 2014/0111347 A1 | 4/2014 | Slapal et al. |
| 2014/0230924 A1 | 8/2014 | Kochan |
| 2014/0360604 A1 | 12/2014 | Rosca et al. |

OTHER PUBLICATIONS

Allen, B., "Harvesting energy from ambient radio signals: A load of hot air?" Loughborough Antennas and Propagation conference, Nov. 12-13, 2012, p. 1-4.

Kane, M.B., et al, "Model-predictive control techniques for hydronic systems implemented on wireless sensor and actuator networks," American Control Conference, Jun. 4-6, 2014, p. 3542-3547.

* cited by examiner

COMBINATION ISOLATION VALVE AND CHECK VALVE WITH INTEGRAL FLOW RATE, PRESSURE, AND/OR TEMPERATURE MEASUREMENT WITH WIRELESS POWER

CROSS-REFERENCE TO RELATED APPLICATIONS

This application claims benefit to provisional application Ser. No. 62/217,355, filed 11 Sep. 2015, which is hereby incorporated by reference in its entirety.

BACKGROUND OF THE INVENTION

1. Field of the Invention

The present invention relates to a valve; and more particularly, the present invention relates to a combination valve for use in a hydronic heating, ventilation and air conditioning (HVAC) system.

2. Brief Description of Related Art

An increasing number of today's hydronic HVAC systems utilize variable frequency drives and variable speed pumps. Most such known systems require shut-off and check valves and flow measurement devices that are either permanently or temporarily installed to verify the system flow rate. When permanently installed in a hydronic HVAC system, these known flow measurement devices take up extra space and increase the system head loss. Significant amounts of extra pipe length may be required depending on the type of flow measurement device being used.

When employed, non-permanent means of flow rate measurement can be labor intensive and, depending on the type of technology used, present a varying degree of accuracy, data portability, and opportunities for water leakage.

Moreover, U.S. Pat. No. 9,366,582, which is assigned to the assignee of the present application and hereby incorporated by reference in its entirety, discloses one such known combination isolation and check valves. Such known combination isolation and check valves like that disclosed in the '582 patent require that its sensors, e.g., which may include some combination of pressure, temperature or flow rate sensors, be powered using a hardwired power source configuration. However, the use of such a hardwires power source configuration can cause or create numerous issues and disadvantages related to connecting or coupling such hardwired power source to such sensors, as follows:

For example, there is a need for physical access to a hardwired power source at or near the combination valve having such sensors therein to power up. There is also a need to physically run, connect or couple electrical wiring from the hardwired power source to the combination valve. The electrical wiring run from the hardwired power source to the combination of the one or more sensors can cause, or result in, associated electrical wiring clutter. The associated electrical wiring clutter for connecting to such hardwired power sources can cause and create electrical and mechanical safety hazards in the HVAC system as a whole, e.g., especially over time.

By way of further example, since the sensors need to be coupled or connected to the electrical wiring, such electrical couplings or connections used can typically be prone to failure, unreliable in the long run, and can easily be compromised themselves over time, e.g., due to moisture, dirt, ambient atmospheric conditions, and movement, including vibrations associated with certain HVAC applications and/or environments. In addition, such sensors, especially if unsealed (e.g. hermetically), may also be compromised themselves over time, e.g., due to exposure to moisture, dirt and ambient atmospheric conditions that can cause corrosion, e.g., from water and oxygen. Moreover still, such sensors themselves can also be compromised over time due to unexpected and undesirable movement from the electrical wiring, e.g., by being disturbed, pulled, and ripped/broken in any such HVAC application and/or environments. The electrical couplings or connections can also prevent or severely compromise the ability to actually seal such sensors in a moisture-resistant enclosure, especially hermetically, if so desired, since the electrical wiring needs to be run into and through the housing of such sensors to provide power.

All of the aforementioned problems can arise in various HVAC applications, e.g., including residential, commercial or industrial applications and/or environments.

In view of this, there is a need for a better way to provide power to operate combination isolation and check valves having such sensors.

SUMMARY OF THE INVENTION

In summary, the present invention provides for a wirelessly powered combination valve for use in a hydronic HVAC system to function as an isolation valve; a check valve; and as a means for measuring fluid parameters, such as flow rate, pressure, and/or temperature. The flow rate, pressure, and/or temperature sensors are to be embedded in the combination valve. These sensors feature a method of transmitting such fluid parameters to various HVAC system controls. Based on the data collected at the combination valve, the signal transmitted to the control device will enable the HVAC system loop pump to adjust its performance and meet the desired system requirements. Specifically, continuous flow rate, pressure, and temperature measurements taken at the wirelessly powered combination valve may be transmitted to a paired device interfacing with the system's controller (e.g., a variable frequency drive (VFD); a building management system (BMS); or other such control device). In operation, the system controller may vary the power supplied to the pump and thus adjust the pump's performance, e.g., based upon the signal received. This creates a continuous I/O (Input/Output) feedback loop where the flow rate, pressure, and/or temperature are the inputs, and the pump performance parameters are the desired outputs. The data can also be transmitted to a handheld device or a remote location for instant evaluation.

The new combination of isolation valve, check valve, with embedded sensors for flow rate, pressure, and/or temperature measurement according to the present invention provides a compact product envelope that achieves space savings, by eliminating the need for separate components in an HVAC system, such as separate isolation valves, check valves, flow meters, pressure gages, and/or thermometers, as well as electrical couplings and connectors for connecting the same to an electrical power source. The continuous I/O feedback loop between the integral sensors of the combination valve and the control device of the pump ensures that maximum energy is saved as the pump and system always run at a desired optimal condition.

According to some embodiments, this new combination valve may be configured to incorporate all of these features in as compact of an envelope as possible to save space and energy when installed. Flow rate, pressure, and/or temperature measurement features that are embedded into this combination valve will eliminate the possibility of leakage that normally exists when probes are inserted into the valve or system accessory to measure the internal fluid pressure or temperature, and substantially reduce unreliability and failure due to the aforementioned issues related to connecting or coupling to an electrical power source. Likewise, this combination valve will produce a single head loss location for system design considerations.

Moreover, some embodiments of this combination valve may incorporate an onboard wireless power receiver, e.g., to energize the various internal sensors and enable data communication. The wireless power transmission may be enabled by a remote transmitter by employing any suitable technology of cordless energy transmission, among which radio frequency (RF) converted to direct current (DC) on board the combination valve is one preferred method.

When acting as a positive shut-off isolation valve, this new combination valve will prevent fluid flow so that maintenance can be performed on the pump or system. When acting as a check valve, this new combination valve will prevent backflow and gravity circulation, which is harmful to pump or system operation when it occurs.

According to some embodiments, flow measurement would occur through an embedded electromagnetic, electromechanical, or mechanical flow measurement device used in combination with the pressure and/or temperature measurements. These sensors may be configured to provide real-time data that can be captured by the system controller to record conditions for the user. Data collected at this new combination valve would, in some embodiments, be wirelessly transmitted to a paired device that interfaces with the system controller (VFD, BMS, or other) and pump. The system controller could likewise wirelessly transmit status updates to the combination valve. The system controller may be configured to direct the pump to increase or decrease speed, e.g., as required to satisfy optimal system conditions. Some embodiments may be configured to use a wired connection to transmit the data between the new combination valve and the system controller.

Wireless power transmission may be configured to energize the various onboard combination valve sensors and enable data transmission from the new combination valve to the pump controller, thus eliminating clutter, electrical and mechanical safety hazards and improving the mechanical set-up of the entire system.

By way of example, once enabled by the remote transmitter, the RF signaling for powering the device may be continuously powering the internal sensors, or periodically powering the internal sensors, or powering the internal sensors based upon the sensing and/or data transmission rate, or some combination thereof.

In particular, and by way of further example, an actual application/implementation may include, or take the form of, employing a continuous wireless power supply to the valve module. The embedded valve sensors may be powered by discrete energy packets for data collection and transmission within the valve module. The data transmission from the valve to the VFD (back to pump) may be configured to occur in discreet data sets, e.g., no less than once per second.

Examples of Particular Embodiments

According to some embodiments, the present invention may take the form of a system or apparatus, e.g., such as a wirelessly powered system, featuring:
a wirelessly powered combination isolation valve and check valve for a hydronic system, having
a positive shut-off isolation valve configured in the hydronic system to prevent fluid flow, including to allow for maintenance of the hydronic system,
a check valve configured in the hydronic system to prevent backflow and gravity circulation which can harm the hydronic system, and
a combination of one or more sensors configured to sense a corresponding combination of one or more pressure, temperature or flow measurements of the fluid flow in the hydronic system and provide sensor signaling containing information about the corresponding combination of the one or more pressure, temperature or flow measurements sensed of the fluid flow in the hydronic system; and
an onboard wireless power receiver configured to receive wireless power signaling, and provide power to energize the combination of the one or more sensors.

According to some embodiments, the system or apparatus may also include one or more of the following features:

The onboard wireless power receiver may be configured to receive the wireless power signaling in the form of radio frequency (RF) signaling and convert the RF signaling into direct current (DC) signaling for powering the combination of the one or more sensors.

The wirelessly powered system may include a remote transmitter configured to provide the RF signaling using cordless energy transmission.

The remote transmitter may be configured to provide the RF signaling either for continuously powering the combination of sensors, or for periodically powering the combination of sensors, or for powering the combination of sensors based upon the sensing and/or data transmission rate, or some combination thereof.

The combination of the one or more sensors may be powered by discrete energy packets for data collection and transmission within the wirelessly powered combination isolation valve and check valve.

The wirelessly powered system may include a wireless data transmission arrangement configured to receive the sensor signaling, and provide wireless data transmission sensor signaling containing information about the combination of the one or more pressure, temperature or flow measurements sensed of the fluid flow in the hydronic system; and the onboard wireless power receiver may be configured to provide power to energize the wireless data transmission arrangement and enable wireless data communication.

The onboard wireless power receiver may include some combination of the following circuitry: a wireless receiver configured to receive the wireless power signaling in the form of wireless RF power signaling; a wireless to DC power converter to convert the wireless RF power signaling into DC power signaling to energize the combination of the one or more sensors; and/or a DC power provisioning module configured to provide the DC power to the combination of the one or more sensors.

The one or more sensors may include DC sensors configured to receive DC signaling and sense the corresponding combination of the one or more pressure, temperature or flow measurements of the fluid flow in the hydronic system.

The one or more sensors may be completely sealed and enclosed, including hermetically, without the need for a coupling or connection to electrical power wiring.

The wirelessly powered system may be, or form part of, an HVAC hydronic system, e.g., including for use in residential, commercial and industrial applications.

Advantages of the Present Invention

This type of wirelessly powered system according to the present invention, e.g., for use in an HVAC system in residential, commercial and industrial applications, includes numerous advantages, as follows: For example, there is no need for physical access to a hardwired power source at or near the combination valve having the one or more sensors to power it up. There is also no need to physically run, connect or couple electrical wiring from any such hardwired power source to the combination valve. Since there is no electrical wiring running from any hardwired power source to the combination valve, this eliminates any adverse effects from associated electrical wiring clutter, e.g., that may arise when using such electrical wiring as set forth above. The elimination of the associated electrical wiring clutter also eliminates any electrical and mechanical safety hazards that may otherwise be caused or created by any such associated electrical wiring clutter in the HVAC system as a whole, e.g., especially over time.

By way of further example, since the sensors do not need to be coupled or connected by the electrical wiring to the hardwired power source, this elimination the need for any such electrical couplings or connections and also eliminates any and all of the problems over time due to moisture, dirt, ambient atmospheric conditions, and movement, including vibrations associated with HVAC applications and/or environments. The elimination of the need for electrical couplings or connections also allows for the ability to seal such sensors in a moisture-resistant enclosure, especially hermetically, if so desired depending on the application. Moreover, since the sensors do not need to be coupled or connected by the electrical wiring to the hardwired power source, this will likely substantially reduce and even eliminate damage to such sensors themselves over time due to moisture, dirt and ambient atmospheric conditions that can cause corrosion, e.g., from water and oxygen, especially if such sensors are not otherwise sealed (e.g. hermetically). Moreover still, such sensors may also not be compromised over time due to movement from any such electrical wiring being disturbed, pulled and ripped/broken in any such HVAC application and/or environments.

In conclusion, the removal of the aforementioned electrical hardwiring and associated physical couplings or connections provide a number of important short term and long term advantages and benefits to the overall HVAC system, especially when compared to systems like that disclosed in the aforementioned '582 patent. In view of this, the present invention provides a better way to provide power to operate combination isolation and check valves having such sensors.

BRIEF DESCRIPTION OF THE DRAWING

The drawing includes the following Figures, not drawn to scale.

Figure 1:
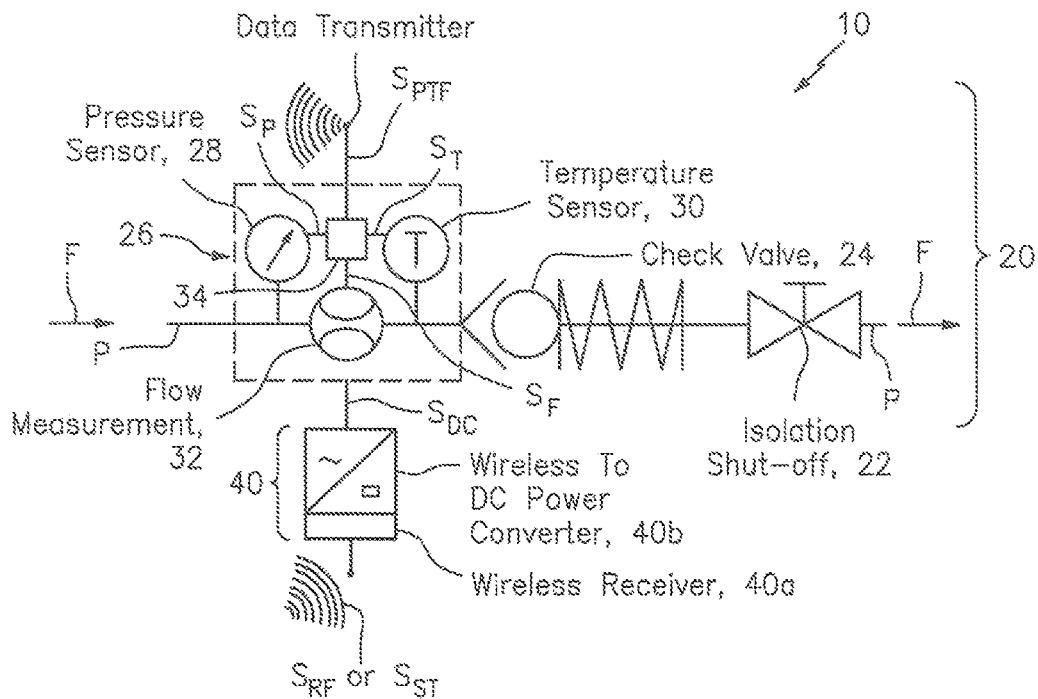
FIG. 1 shows a diagram of a wireless powered system, according to some embodiments of the present invention.

The Figures include reference numerals and lead lines, which are included to describe each Figure in detail below. In the drawing, similar elements in the various Figures are labeled with similar reference numerals and lead lines. Moreover, not every element is shown and/or labeled with a reference numeral and lead line in every Figure to reduce clutter in the drawing as a whole.

DETAILED DESCRIPTION OF THE INVENTION

FIGS. 1-2

FIG. 1 shows a system or apparatus, e.g., such as a wirelessly powered system generally indicated as 10, featuring a wirelessly powered combination isolation valve and check valve 20 in combination with an onboard wireless power receiver 40 (aka a wireless to DC power converter and wireless receiver).

Figure 2:
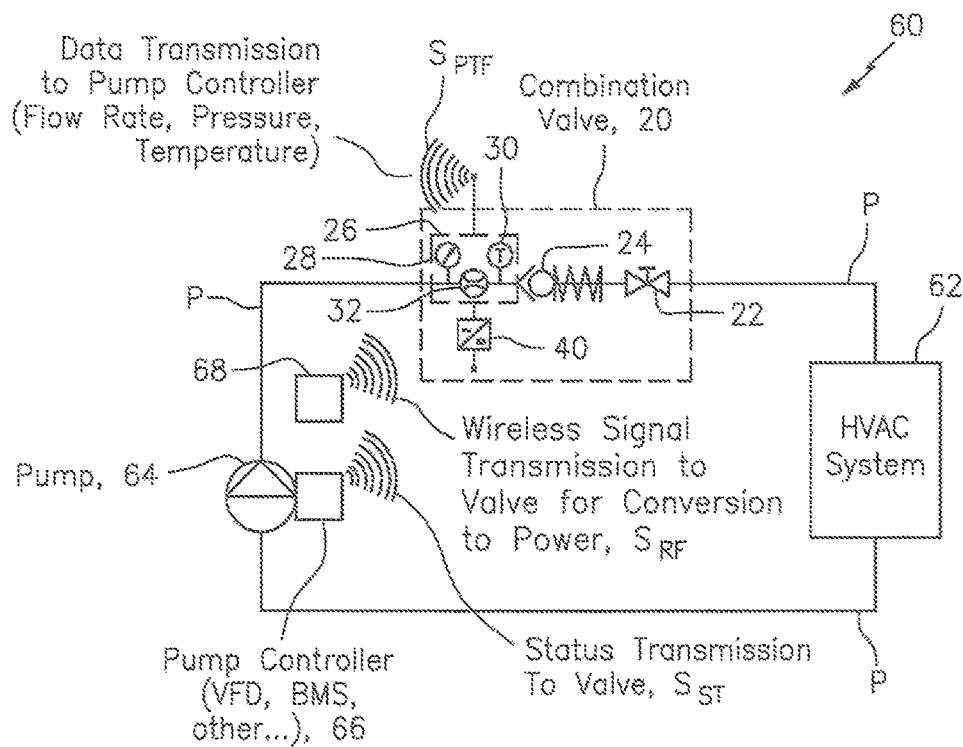
FIG. 2 shows a diagram of a hydronic system having the wireless powered system shown in FIG. 1, a combination of a pump and pump controller, and an HVAC system, according to some embodiments of the present invention.

The wirelessly powered combination isolation valve and check valve 20 may be configured for a hydronic system generally indicated as 60 and shown in FIG. 2, e.g., for processing fluid F flowing through piping P. By way of example, the hydronic system 60 may include an HVAC system 62 arranged in relation to a pump 64 and a pump controller 66 coupled by associated piping. According to some embodiments, the pump controller 66 may be configured to provide control signaling for operating a remote transmitter 68, e.g., consistent with that set forth herein.

The wirelessly powered combination isolation valve and check valve 20 may be configured to include the following:
 a positive shut-off isolation valve 22 configured in the hydronic system 60 (FIG. 2) to prevent fluid flow, including to allow for maintenance of the hydronic system 60,
 a check valve 24 configured in the hydronic system 60 to prevent backflow and gravity circulation which can harm the hydronic system 60, and
 a combination 26 of one or more sensors 28, 30, 32 configured to sense a corresponding combination of one or more pressure, temperature or flow measurements of the fluid flow in the hydronic system 60 and provide sensor signaling $S_{PTF}$ containing information about the corresponding combination of the one or more pressure, temperature or flow measurements sensed of the fluid flow in the hydronic system 60.

The onboard wireless power receiver 40 may be configured to receive wireless power signaling $S_{RF}$, and provide power (e.g., direct current (DC) signaling $S_{DC}$) to energize, e.g. the combination of the one or more sensors 28, 30, 32.

According to some embodiments, the system or apparatus 10 may also include one or more of the following features:

The onboard wireless power receiver 40 may be configured to receive the wireless power signaling $S_{RF}$ in the form of radio frequency (RF) signaling and convert the RF signaling into the DC signaling $S_{DC}$ for powering the combination of the one or more sensors 28, 30, 32. In FIG. 1, the onboard wireless power receiver 40 is shown providing the DC signaling $S_{DC}$ to the combination 26; and as one skilled in the art would appreciate, the DC signaling $S_{DC}$ is understood to be provision, e.g., via hardwiring to the one or more sensors 28, 30, 32 for providing power to each sensor. (The hardwiring is not shown to reduce clutter in the drawing.) In other words, according to some embodiments of the present invention, the onboard wireless power receiver 40 is understood to be physically connected or coupled to the one or more sensors 28, 30, 32 and the wireless data transmission arrangement 34, so that the onboard wireless power receiver 40 can provide, and the one or more sensors 28, 30, 32 and the wireless data transmission arrangement 34 can receive, suitable DC signaling $S_{DC}$ for powering the one or more sensors 28, 30, 32 and the wireless data transmission arrangement 34.

The wirelessly powered system 10 may include the remote transmitter 68 (see FIG. 2) configured to provide the RF signaling $S_{RF}$ using cordless energy transmission. The remote transmitter 68 may be configured to provide the RF signaling $S_{RF}$ either for continuously powering the combination of sensors 28, 30, 32, or for periodically powering the combination of sensors 28, 30, 32, or for powering the combination of sensors 28, 30, 32, e.g. based upon the sensing and/or data transmission rate, or some combination thereof. The pump controller 66 may be configured to provide suitable control signaling to the remote transmitter 68 to provide the RF signaling $S_{RF}$ using the cordless energy transmission. Remote transmitters like element 68, e.g., for providing suitable RF signaling like signaling $S_{RF}$, are known in the art, and the scope of the invention is not intended to be limited to any particular type or kind thereof either now known or later developed in the future.

By way of example, the combination of the one or more sensors 28, 30, 32 may be powered by discrete energy packets for data collection and transmission within the wirelessly powered combination isolation valve and check valve 20. In other words, the pump controller 66 may be configured to provide control signaling to the remote transmitter 68 for powering each sensors 28, 30, 32 with a respective discrete energy packet for a respective data collection and transmission, e.g., depending on the application. In effect, the pump controller 66 and the remote transmitter 68 may be configured to selectively provide the respective discrete energy packets for selective data collection and transmission from selective sensors.

The wirelessly powered system 10 may include a wireless data transmission arrangement 34 configured to receive sensor signaling $S_P, S_T, S_F$ from the sensors 28, 30, 32, and provide the sensor signaling $S_P, S_T, S_F$ in the form of wireless data transmission sensor signaling $S_{PTF}$ containing information about the combination of the one or more pressure, temperature or flow measurements sensed of the fluid flow in the hydronic system 60. FIG. 1 shows the wireless data transmission arrangement 34 arranged in, or forming part of, the combination 26 with a signaling exchange between each sensor 28, 30, 32 and the wireless data transmission arrangement 34, which may include the sensor signaling $S_P, S_T, S_F$ transferred from each sensor to the wireless data transmission arrangement 34. Consistent with that set forth herein, the onboard wireless power receiver 40 may also be configured to provide power in the form of the DC signaling $S_{DC}$ to energize the wireless data transmission arrangement 34 and enable the wireless data communication, e.g., back to a pump controller 66 (FIG. 2).

By way of example, the onboard wireless power receiver 40 may include, or take the form of, a wireless receiver 40a configured to receive the wireless power signaling $S_{RF}$ in the form of wireless RF power signaling, as well as the status transmission signal $S_{ST}$ from the controller 66 (FIG. 2). The onboard wireless power receiver 40 may also include, or take the form of, a wireless to DC power converter 40b configured to convert the wireless RF power signaling received into DC power signaling to energize the combination of the one or more sensors 28, 30, 32. The onboard wireless power receiver 40 may also include a DC power module (not shown) configured to provide the DC power signaling to the combination of the one or more sensors 28, 30, 32. In FIGS. 1 and 2, the onboard wireless power receiver 40 is understood to contain the circuitry for implementing all the aforementioned wireless power conversion and receiver functionality. As one skilled in the art would appreciate, the onboard wireless power receiver 40 and its associated functionality may be implemented in one stand alone circuit, module or unit, as well as two or more separate circuits, modules or units. In other words, the scope of the invention is not intended to be limited to any specific implementation of the structure and functionality of the onboard wireless power receiver 40.

The one or more sensors 28, 30, 32 may be DC sensors configured to receive DC signaling $S_{DC}$, sense the corresponding combination of the one or more pressure, temperature or flow measurements of the fluid flow in the hydronic system, and provide the sensor signaling $S_P, S_T, S_F$, e.g., to the wireless data transmission arrangement 34.

According to some embodiments, the one or more sensors 28, 30, 32 may be completely sealed and enclosed, including hermetically, without the need for a coupling or connection to power wiring, so the sensor are not subject to, or compromised by, moisture, dirt and ambient atmospheric conditions that can cause malfunction and/or corrosion, e.g., from water and oxygen.

FIG. 2: The Hydronic System 60

By way of example, FIG. 2 shows the hydronic system 60 as one possible embodiment for the wirelessly powered system 10. Embodiments are envisioned, and the scope of the invention is intended to include, using the wirelessly powered system 10 is other types or kind of systems that are either now known or later developed in the future.

The hydronic system 60 includes the HVAC system 62, the pump 64 and the controller 66. As one skilled in the art would appreciate, HVAC systems like element 62 are known in the art, and the scope of the invention is not intended to be limited to any particular type or kind thereof either now known or later developed in the future. Moreover, pumps like element 64 and pump controllers like element 66 are also known in the art, and the scope of the invention is not intended to be limited to any particular type or kind thereof either now known or later developed in the future.

In FIG. 2, the pump controller 66 may be configured with a wireless transmitter to provide wireless transmitter controller signaling $S_{ST}$ containing information about a status transmission request from the controller 66 to the wirelessly powered system 10. By way of example, the onboard wireless power receiver 40 may be configured to receive the wireless transmitter controller signaling $S_{ST}$, and provide corresponding wireless transmitter controller signaling to the wireless data transmission arrangement 34 for processing the status transmission request. In response, the wireless data transmission arrangement 34 may be configured to provide the wireless data transmission sensor signaling $S_{PTF}$ containing information with a suitable status transmission reply. In FIG. 2, the wireless data transmission arrangement 34 is not shown to reduce clutter in the drawing. The reader is referred to FIG. 1, which shows this element and its interconnection with the various sensors 28, 30, 32.

Wireless to DC Power Converters

Wireless to DC power converters that receive radio frequency (RF) signaling and convert the same into direct current (DC) signaling are known in the art; and the scope of the invention is not intended to be limited to any particular type or kind thereof, e.g., either now known or later developed in the future. By way of example, the reader is referred to U.S. Pat. No. 8,461,817, which is hereby incorporated by reference in its entirety.

Wireless Transmitters/Receivers

Wireless transmitters/receivers that transmit/receive wireless signaling are known in the art; and the scope of the

What we claim is:

1. A wirelessly powered system, comprising
a wirelessly powered combination valve for a hydronic system, having
  a positive shut-off isolation valve configured in the hydronic system to prevent fluid flow, including to allow for maintenance of the hydronic system,
  a check valve configured in the hydronic system to prevent backflow and gravity circulation which can harm the hydronic system, and
  one or more sensors configured to sense one or more corresponding pressure, temperature or flow measurements of the fluid flow in the hydronic system and provide sensor signaling containing information about the one or more corresponding pressure, temperature or flow measurements sensed of the fluid flow in the hydronic system; and
an onboard wireless power receiver configured to receive wireless power signaling, and provide power to energize the one or more sensors.

2. The wirelessly powered system according to claim 1, wherein the onboard wireless power receiver is configured to receive the wireless power signaling in the form of radio frequency (RF) signaling and convert the RF signaling into direct current (DC) signaling for powering the combination of the one or more sensors.

3. The wirelessly powered system according to claim 2, wherein the wirelessly powered system comprises a remote transmitter configured to provide the RF signaling using cordless energy transmission.

4. The wirelessly powered system according to claim 3, wherein the remote transmitter is configured to provide the RF signaling either for continuously powering the one or more sensors, or for periodically powering the one or more sensors, or for powering the one or more sensors based upon the sensing and/or data transmission rate, or some combination thereof.

5. The wirelessly powered system according to claim 1, wherein the one or more sensors is powered by discrete energy packets for data collection and transmission within the wirelessly powered combination isolation valve and check valve.

6. The wirelessly powered system according to claim 1, wherein
the wirelessly powered system comprises a wireless data transmission arrangement configured to receive the sensor signaling, and provide wireless data transmission sensor signaling containing information about the one or more pressure, temperature or flow measurements sensed of the fluid flow in the hydronic system; and
the onboard wireless power receiver is configured to provide power to energize the wireless data transmission arrangement and enable wireless data communication.

7. The wirelessly powered system according to claim 1, wherein the onboard wireless power receiver comprises a wireless receiver configured to receive the wireless power signaling in the form of wireless RF power signaling.

8. The wirelessly powered system according to claim 7, wherein the onboard wireless power receiver comprises a wireless to DC power converter to convert the wireless RF power signaling into DC power signaling to energize the one or more sensors.

9. The wirelessly powered system according to claim 8, wherein the onboard wireless power receiver comprises a DC power provisioning module configured to provide the DC power to the one or more sensors.

10. The wirelessly powered system according to claim 1, wherein the onboard wireless power receiver comprises a wireless to DC power converter to convert the wireless power signaling into DC power signaling to energize the one or more sensors.

11. The wirelessly powered system according to claim 1, wherein the one or more sensors are DC sensors configured to receive DC signaling and sense the one or more pressure, temperature or flow measurements of the fluid flow in the hydronic system.

12. The wirelessly powered system according to claim 1, wherein the one or more sensors are completely sealed and enclosed, including hermetically, without the need for a coupling or connection to electrical power wiring.

13. The wirelessly powered system according to claim 1, wherein the wirelessly powered system is, or forms part of, an HVAC hydronic system for use in residential, commercial or industrial applications.

* * * * *